United States Patent [19]

Arai et al.

[11] 4,004,269
[45] Jan. 18, 1977

[54] BRAKE LINING WEAR WARNING SYSTEM

[75] Inventors: Hiroshi Arai, Toyota; Koichi Taniguchi, Kariya, both of Japan

[73] Assignees: Nippondenso Co., Ltd., Kariya; Toyota Jidosha Kogyo Kabushiki Kaisha, Toyota, both of Japan

[22] Filed: July 25, 1974

[21] Appl. No.: 491,777

[30] Foreign Application Priority Data

July 28, 1973 Japan .............................. 48-85082

[52] U.S. Cl. .............................. 340/52 A; 188/1 A; 200/61.4
[51] Int. Cl.² ........................................ B60T 17/22
[58] Field of Search ............ 340/52 R, 52 A, 52 B, 340/52 C, 52 F; 200/61.4, 61.44; 180/103; 188/1 A

[56] References Cited

UNITED STATES PATENTS

| 3,556,258 | 1/1971 | Winge et al. | 188/1 |
|---|---|---|---|
| 3,593,264 | 7/1971 | Atkins | 340/52 D |
| 3,660,815 | 5/1972 | Rees | 340/52 A |
| 3,675,197 | 7/1972 | Bennett et al. | 340/52 A |
| 3,735,343 | 5/1973 | Lane et al. | 340/52 A |
| 3,740,566 | 6/1973 | Newstead | 307/10 R |
| 3,759,582 | 9/1973 | Ohta et al. | 303/21 AF |
| 3,810,086 | 5/1974 | Bensel et al. | 340/52 F |

FOREIGN PATENTS OR APPLICATIONS

| 1,680,107 | 12/1971 | Germany |
| 2,137,855 | 2/1973 | Germany |

OTHER PUBLICATIONS

Richard B. Hurley, *Transistor Logic Circuits*, John Wiley & Sons, Inc., 1961, pp. 294–295.

*Primary Examiner*—John W. Caldwell
*Assistant Examiner*—Joseph E. Nowicki
*Attorney, Agent, or Firm*—Cushman, Darby & Cushman

[57] ABSTRACT

A brake lining wear warning system comprising a probe which becomes nonconductive when the wear of a brake lining reaches a critical value, a holding circuit adapted to be placed in a set condition in response to the nonconduction of the probe and remain in the set condition even after the termination of the nonconduction of the probe, and a warning device for giving a warning when the holding circuit is in the set condition.

11 Claims, 6 Drawing Figures

BRAKE LINING WEAR WARNING SYSTEM

The present invention relates to improvements in or relating to brake lining wear warning systems for automobiles whereby when the wear of the lining on a disk brake reaches a critical value, it is detected to give a warning.

The present invention will be described in greater detail with reference to the accompanying drawings, in which.

Figure 1:
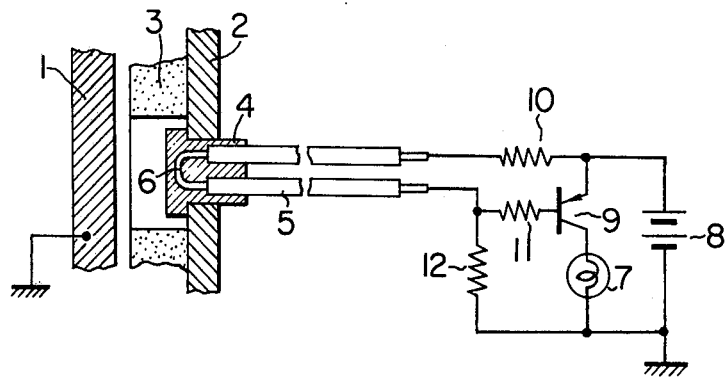
FIG. 1 is a schematic diagram showing an exemplary form of a conventional brake lining wear warning system.

A known type of brake lining wear warning system is shown in FIG. 1, in which numeral 1 designates the electrically grounded disk of a disk brake, 2 a brake pad backing plate to which is bonded a lining 3 constituting a friction material. When the rotation of the wheel is to be stopped, the backing plate 2 is forced to the left in FIG. 1 by a brake caliper (not shown) attached to the vehicle body through brake pistons (not shown) and thus a frictional force is produced between the lining 3 and the disk 1. When, as the result of this braking action, the wear of the lining 3 exceeds a critical value, it results in a reduced braking effectiveness and therefore a warning is given to the driver when the wear of the brake lining 3 reaches the critical valve. The construction of this warning arrangement is as follows. That is, numeral 4 designates a probe, 5 an electric wire, 6 a core wire, 7 a warning lamp, 8 a battery, 9 a PNP transistor, 10, 11 and 12 bias resistors for the transistor 9 whose resistance values are normally selected to maintain the voltage applied between the base and emitter of the transistor 9 below the threshold voltage. Before the lining 3 has not worn down to the critical value, the resistance value of the bias resistors 10, 11 and 12 renders the transistor 9 nonconductive and thus the warning lamp 7 remains off. Thereafter, as the lining 3 wears down further so that the exposed core wire 6 in the probe 4 is brought into contact with the disk 1 by the application of the brakes, the potential at the junction point of the bias resistors 11 and 12 is decreased to the ground potential. Consequently, current flows to the base of the transistor 9 through the circuit including a power source 8, the emitter-base, resistor 11, the core wire 6, the disk 1 and the ground, and the transistor 9 is rendered conductive to switch the warning lamp 7 on. When the brakes are released so that the core wire 6 separates from the disk 1, the warning lamp 7 is switched off. Repetitions of the braking operation causes the lining 3 to wear down still further and eventually the core wire 6 is broken due to the friction between the core wire 6 and the disk 1. When this occurs, independently of any further braking operations, the transistor 9 is maintained in the conductive condition and thus the warning lamp 7 remains on, continuously warning the driver that the lining 3 has worn to the critical value.

However, there are many instances where the disk 1 is floated from the ground potential. In such a case, each time the brakes are applied, the core wire 6 is energized through the electrically conductive disk 1 thus producing the same condition as when the nonconductive condition has been removed to restore the normal condition. Consequently, the transistor 9 is rendered nonconductive and the warning lamp 7 is switched off. This gives rise to a phenomenon where the warning lamp 7 is switched off every time the brakes are applied even after the wear of the lining 3 has reached the critical value, thus causing the driver to make erroneous judgements.

Figure 2:
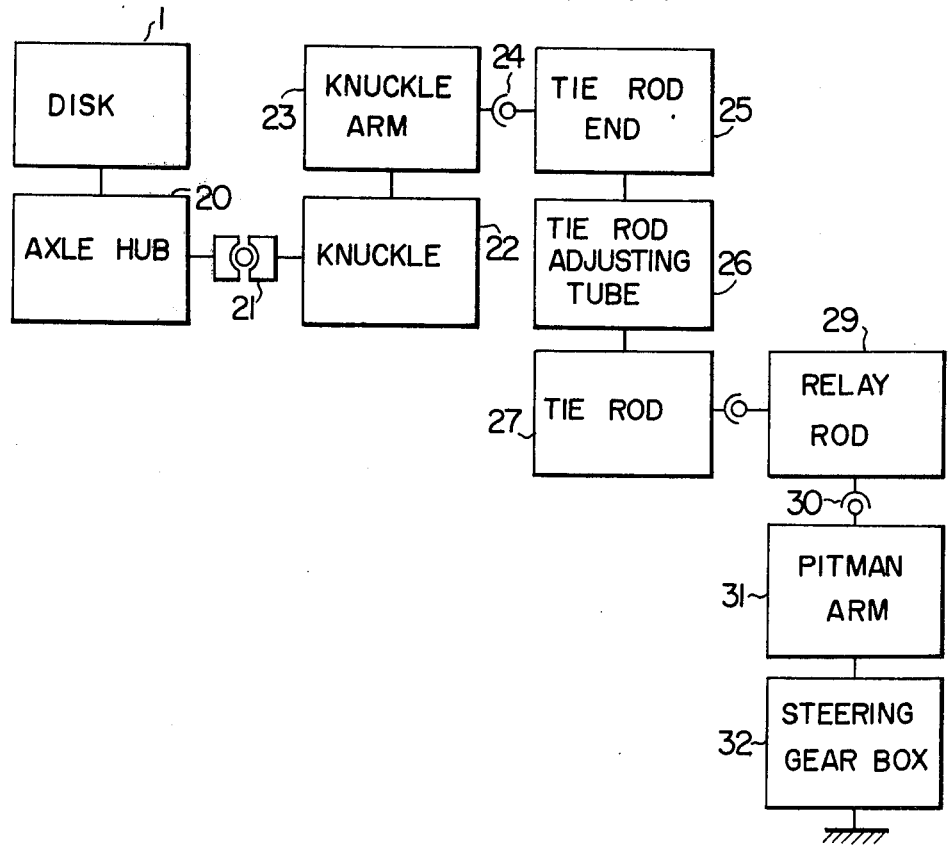
FIG. 2 is a block diagram showing an electric equivalent circuit for the connections between the brake and the ground of the system shown in FIG. 1.

As will be discussed hereinafter, there is an ample possibility of the disk 1 floating from the ground potential thus causing the operating difficulty above. In other words, in the block diagram of FIG. 2 showing an electrical equivalent circuit for the mechanical connections extending from the disk 1 to the vehicle ground potential on one side of the wheel, all the component elements are steel parts which can be considered as electric conductors, and these parts are connected to one another by means of bolts, for example. The disk 1 is attached to an axle hub 20 which is in turn attached to a knuckle 22 through wheel bearings 21. The knuckle 22 is connected to one end of a knuckle arm 23 whose other end is connected to a tie rod end 25 through a first ball joint 24 constituting a universal joint and through a tie rod adjusting tube 26, a tie rod 27 and a second ball joint 28 to a relay rod 29. On the other hand, a steering gear box 32 is bolted to the vehicle body and it is maintained at the ground potential. The relay rod 29 is connected to the steering gear box 32 through a pitman arm 31 and a third ball joint 30. Consequently, the relative motion of the elements takes place at four points, i.e., at the wheel bearings 21 and the first, second and third ball joints 24, 28 and 30, and a grease which is a lubricant is sealed at each of these points to permit smooth transmission of rotary motion. Usually, this grease is not an electrically good conductor and consequently these four barriers make it difficult to reliably maintain the disk 1 always at the ground potential, frequently causing the disk 1 to float from the ground potential.

It is therefore an object of the present invention to overcome the foregoing deficiencies. In accordance with the present invention, there is thus provided a brake lining wear warning system in which when the wear of a brake lining reaches a critical value, a probe becomes nonconductive to set a holding circuit and it is held in this set condition even after the termination of the nonconduction of the probe to cause warning means to continuously give a warning. Consequently, once the wear of the brake lining has reached the critical value, not only a warning is given to the driver but also thereafter the warning is maintained, whereas when a wiring fault occurs in the probe, a warning is also issued and maintained in the similar manner.

It will thus be seen that the system according to the present invention has among its great advantages the fact that it is capable of detecting the wearing down of a brake lining to a critical value through a wiring fault of a probe and hence it is also capable of giving a warning when a wiring fault occurs in the probe or at any portion in the connections between the probe and the steering gear box.

Another great advantage of the system of this invention is that once probe has become faulty and the wearing down of the brake lining to the critical value has been detected, irrespective of whether the disk opposite to the brake lining is at the ground potential, a warning is issued and thereafter the warning is positively maintained.

Figure 3:
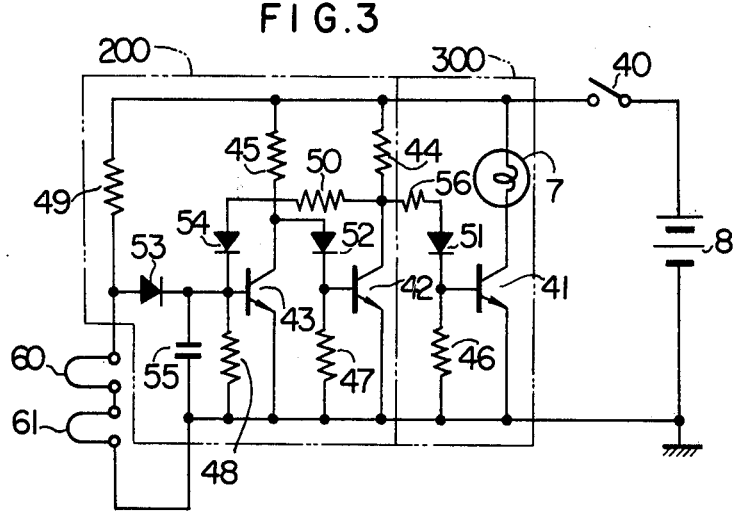
FIGS. 3, 4, 5 and 6 are wiring diagrams showing respectively first, second, third and fourth embodiments of a brake lining wear warning to the present invention.

Referring to FIG. 3, there is illustrated a wiring diagram of a first embodiment of a brake lining wear warning system according to the invention. In FIG. 3, numerals 60 and 61 designate probes equivalently shown by way of their core wires and identical with the one shown in FIG. 2, so that when the wear of a brake lining reaches a critical value the probe is broken thus becoming nonconductive. One of the probes is incorporated in the pad on the left side of a front wheel disk brake and the other probe is incorporated in the pad on the right side of the disk brake. Numeral 41 designates an NPN type switching transistor for operating a warning lamp 7. A transistor circuit formed with two NPN transistors 42 and 43 constitutes a warning holding circuit 200 which constitutes the main feature of the present invention and in which the nongrounded side of the series circuit comprising the probes 60 and 61 is connected to the base of the first transistor 43 through a diode 53. The output terminal of the first transistor 43 is connected to the base of the second transistor 42 through a diode 52, and the output terminal of the second transistor 42 is connected to the base of the lamp operating transistor 41 through a diode 51 and a resistor 56 and also to the base of the first transistor 43 through a series feedback circuit comprising a feedback resistor 50 and a diode 54. Resistors 46 through 49 are provided for respectively biasing the transistors 41, 42 and 43, and resistors 44 and 45 are load resistors for the transistors 42 and 43. The diodes 51, 52 and 53 are provided for level shifting purposes to respectively ensure positive switching action of the transistors 41, 42 and 43. Numeral 40 designates an engine key switch for closing the power circuit, 300 warning means.

With the construction described above, the operation of the first embodiment is as follows. When the engine key switch 40 is closed, capacitor charging current flows through the resistor 49, the diode 53 and a capacitor 55, so that the capacitor 55 is charged and the transistor 43 remains in the nonconductive state for a short period of time until the potential at the base of the transistor 43 becomes higher than the threshold voltage between the base and emitter thereof. Consequently, the battery voltage divided by the resistor 45, the diode 52 and the resistor 47 is applied to the base of the transistor 42 and this voltage exceeds its base-emitter threshold voltage to render the transistor 42 conductive. As a result, the output of the transistor 42 is decreased to a value close to the ground potential, so that no base current flows to the transistor 41 keeping it nonconductive and the warning lamp 7 is not lighted, while the feedback to the base of the transistor 43 through the feedback circuit is reduced to zero. In this way, when the engine key switch 40 is closed, the warning holding circuit 200 is positively placed in its reset condition (the warning lamp 7 is turned off by the action of the capacitor 55. At this time, that is, when both of the probes 60 and 61 are still in the conductive conduction or when the linings have not worn down to the critical value, the potential across the capacitor 55 does not exceed the base-emitter threshold voltage of the transistor 43 and therefore the warning holding circuit 200 is maintained in the reset condition.

When either of the probes 60 and 61 is broken or when a wiring fault occurs in any part of the wires connecting the probes 60 and 61 to the warning holding circuit 200, the charging of the capacitor 55 is started immediately so that the potential across the capacitor 55 becomes higher than the base-emitter threshold voltage of the transistor 43 and the transistor 43 is rendered conductive. Consequently, the output voltage of the transistor 43 becomes close to the ground potential so that the transistor 42 is rendered nonconductive and the lamp operating transistor 41 is rendered conductive, thus causing the warning lamp 7 to go on. Simultaneously, the base of the transistor 43 is biased through the resistor 44 and through the feedback resistor 50 and the diode 54, with the result that the broken probe 60 or 61 is forced against the disk again to establish a closed circuit through the electrically conductive material of the disk. Consequently, when the flow of the bias current to the transistor 43 through the resistor 49 and the diode 53 is stopped, the bias applied to the transistor 43 by the feedback circuit maintains the transistor 43 in the conductive condition and hence the warning holding circuit 200 is maintained in the set condition (the warning lamp 7 is lighted). This condition is maintained until the engine key switch 40 is opened. It will thus be seen that with the brake lining wear warning system employing the breakable probes 60 and 61, there is no need to maintain the disk body at the battery ground potential, and once the probe 60 or 61 has been broken and the warning lamp 7 has been lighted, the warning lamp 7 is maintained on even when the broken portion of the probe again comes into contact with the disk to terminate the nonconductive condition and restore the conductive condition.

While, in the first embodiment described above, the holding circuit 200 comprises a transistor circuit, the present invention is not limited to the transistor circuit. For example, the holding circuit 200 may be a self-holding circuit comprising a combination of relays. In this case, the transistor 41 is not needed and the warning means 300 comprises only the warning lamp 7.

Figure 4:
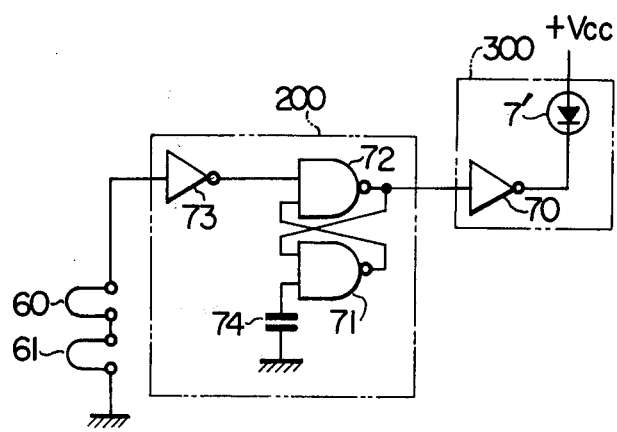

FIG. 4 illustrates a second embodiment of the invention which is a modification of the first embodiment of FIG. 3 for constructing the system with integrated circuits (IC). With automotive vehicles, it is useful to miniaturize the system because of the limited space available for mounting it in the vehicle. With the system of the size shown in FIG. 3, it is not difficult to realize the system with the use of monolithic IC's located within a 14-pin dual-in-line package. FIG. 4 illustrates the logical designing of the system employing IC's. In FIG. 4, numeral 7' designates a light emitting diode corresponding to the warning lamp 7 in the embodiment of FIG. 3, which may for example be a red emitting diode. Numerals 70 and 73 designate NOT gates, 71 and 72 NAND gates, which are all represented by logical symbols. In accordance with the prevailing custom, the power source and the grounding conductors are not shown. As regards the detailed internal connections of the logical gates, the NOT gate 73 may for example be the SN 7404 manufactured by Texas Instruments Incorporated (TI) of U.S.A., NAND gates 71 and 72 may for example the TI SN 7400, and the NOT gate 70 may for example be the TI SN 7416 of the open-collector type.

With the construction described above, the second embodiment of FIG. 4 operates as follows. When the engine key switch (not shown) is closed, power supply voltage $+V_{CC}$ is applied to the illustrated circuitry. The input and outputs of the NAND gates 71 and 72 are interconnected by the respective crossed feedback circuits to constitute a flip-flop. The flip-flop circuit is designed so that when the power circuit is closed, a capacitor 74 connected to one input of the NAND gate 71 maintains, until the completion of the charging of the capacitor 74, the flip-flop in its reset condition in which the output of the NAND gate 71 goes to a HIGH level and hence the output of the NAND gate 72 goes to a LOW level, and consequently the output of the NOT gate 70 goes to the H level or $+V_{CC}$. As a result, no current flows to the warning light emitting diode 7' and the diode 7' emits no light.

On the other hand, when either of the probes 60 and 61 is broken, the output of the NOT gate 73 charges from the H to the L level and the flip-flop changes it state, i.e., it is set. Consequently, the output of the NAND gate 72 changes to the H level and the output of the NAND gate 71 changes to the L level, thus causing the light emitting diode 7' to emit light to give a warning. Once the flip-flop has been set in the manner described, irrespective of whether the output of the NOT gate 73 goes to the H level or the L level, the flip-flop does not change it state and the warning is thus maintained. This condition is maintained until the engine key switch is opened.

Figure 5:
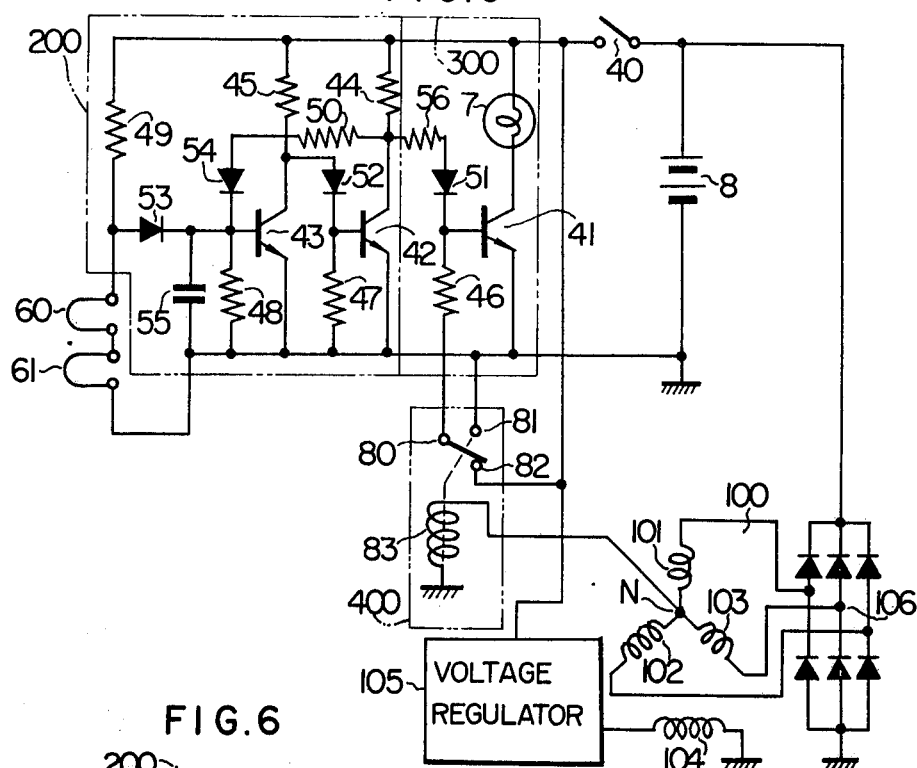
Figure 6:
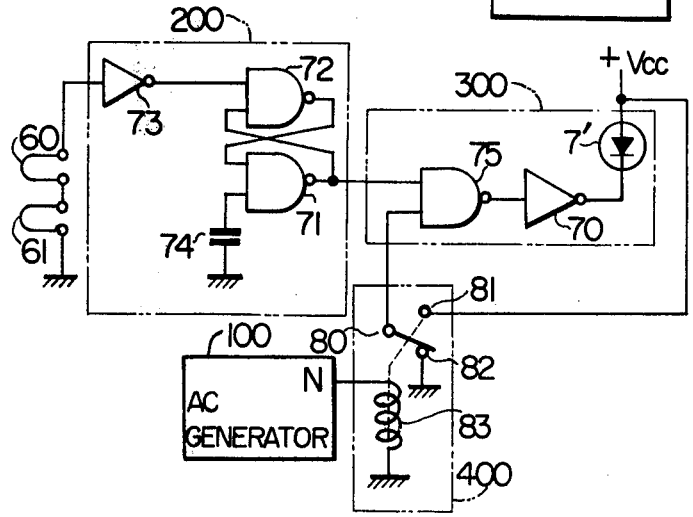

FIGS. 5 and 6 illustrate respectively third and fourth embodiments of the invention in which there is added a mechanism for checking for example the light emitting diode 7' in the warning means 300 for abnormal conditions prior to the starting of the engine. If, for example, the filament of the warning lamp 7 burns out or any fault occurs in the lamp operating circuit, there is no ways and means to tell the driver that the brake lining has worn down. Therefore, it is essential to check the warning means 300 for defects at least every time the engine is to be started.

In the third embodiment of FIG. 5, the component elements designated by the same reference numerals are identical with those described in connection with the first embodiment of FIG. 3. Numeral 100 designates a three-phase AC generator for vehicle in which generating coils 101, 102 and 103 are Y-connected and their outputs are full-wave rectified by the associated rectifier diodes 106. Numeral 104 designates a field coil for generating a DC field. The current flowing through the field coil 104 is controlled by a voltage regulator 105 to maintain the output voltage at a predetermined value. When the number of revolutions of the generator 100 becomes higher than the idling speed, for example, a DC voltage which is about one half of the maximum output voltage is generated at a neutral point N of the Y-connected generating coils 101, 102 and 103. Numeral 400 designates a relay constituting forced operation means whereby the warning means 300 is forcibly actuated in response to the closing of the key switch 40 for detecting any faulty condition of the warning means. Numeral 83 designates a relay coil which is energized by the potential at the neutral point N of the AC generator 100 to operate a movable contact 80. A stationary contact 81 is connected to the ground potential and the other stationary contact 82 is connected to the positive battery potential through the engine key switch 40, while the movable contact 80 is connected to one end of the bias resistor 46. The movable contact 80 is normally held in contact with the stationary contact 82, so that in response to the generation of the potential at the neutral point N of the AC generator 100, the relay coil 83 is energized to change the movable contact 80 from the stationary contact 82 to the stationary contact 81. The relay 400 may be replaced with a contactless discrimination circuit for discriminating the potential at the neutral point N.

In operation, at the moment that the engine key switch 40 is closed, the engine is still at rest and hence the AC generator 100 driven from the engine is also at rest with the zero potential at the neutral point N. At this time, independently of the output of the preceding warning holding circuit 200, the base current flows to the base of the transistor 41 through the circuit including the key switch 40, the stationary contact 82, the movable contact 80 and the bias resistor 46 to render the transistor 41 conductive. Consequently, if there is no fault in the warning lamp 7, it goes on thus giving an indication that the warning lamp 7 is functioning normally. In this case, the preceding warning holding circuit 200 is protected against the effects of this check by the diode 51.

When the engine is eventually started, a voltage is generated at the neutral point N of the AC generator 100 and the relay coil 83 is energized, with the result that the movable contact 80 is moved to the stationary contact 81 and the bias resistor 46 is maintained at the ground potential. Thereafter, the process of operation as described in connection with the embodiment of FIG. 3 takes place.

It will thus be seen from the foregoing description that if the driver cannot confirm the lighting of the warning lamp 7 during any given period of time between the closing of the engine key switch 40 and the starting of the engine, it is an indication that there is a fault in the warning means 300, and the driver can take any effective measure such as the replacement of the warning lamp 7 to restore the normal warning function. Further, provision of this checking function can be accomplished through the utilization of the existing AC generator 100 with the addition of a very simple means, i.e., the relay 400.

The fourth embodiment of FIG. 6 differs from the second embodiment of FIG. 4 in that a circuit is further included which performs a preliminary check on the warning means 300 including the light emitting diode 7' for detecting defects. While the operation of the relay 400 comprising the relay coil 83, movable contact 80 and stationary contacts 81 and 82 is the same as described in connection with the third embodiment of FIG. 5, differing from the third embodiment of FIG. 5, the stationary contact 82 is held at the ground potential and the stationary contact 81 is connected to the power supply side $+V_{CC}$. Further, in contrast to the second embodiment of FIG. 4, the output of a NAND gate 75 is connected to the input of the NOT gate 70 consisting of the open collector type inverter, and the NAND gate 75 has its one input connected to the output of the NAND gate 71 in the flip-flop and the other input connected to the movable contact 80. Consequently, during the time between the closing of the engine key switch (not shown) and the starting of the engine, one of the input of the NAND gate 75 is connected to the stationary contact 82 and it goes to the LOW or L level and thus the output of the NAND gate 75 goes to the HIGH or H level irrespective of the output of the flip-flop. Consequently, the output of the NOT gate 70 goes to the L level, so that if the light emitting diode 7' is functioning normally, it is lighted thus accomplishing the inspection of the warning means 300 for defects. After the engine has been started, the input of the NAND gate 75 which is connected to the movable contact 80 goes to the H level to open it and thus, independently of the clock circuit comprising the AC generator 100 and the relay 400, the system operates in the manner as described in connection with the second embodiment of FIG. 4 and it gives a warning when the brake lining wears down to the critical value.

While, in the third and fourth embodiments of the invention described above, the means for automatically checking the warning means 300 comprises, in combination, the AC generator 100 and the relay 400, the present invention is not intended to be limited to it. For instance, an arrangement employing no contacts may be provided by using a timer circuit operatively associated with the key switch 40. Further, instead of using the AC generator 100 as stopping means for terminating the forced operation of the warning means 300 by the relay 400, a running sensor or the like may be used which stops the forced operation of the warning means when the vehicle gets a speed after starting.

What we claim is:

1. A brake lining wear warning system for a vehicle comprising:
    a. a probe for placement in a brake lining and defining a current path which becomes electrically nonconductive when said brake lining wears down to a critical value;
    b. switch means for connecting and disconnecting said probe to a power supply;
    c. a holding circuit including a flip-flop having first and second stable states and reset means connected to said flip-flop for causing, when operated, said flip-flop to assume said first state, means for connecting said flip-flop to said probe for causing said flip-flop to shift into said second state in response to the nonconductive condition of said probe path and to remain in that state and produce a wire breakage detection signal even if thereafter the nonconductive condition of said probe path changes to a conductive condition, said reset means including means operated by said switch means for applying a reset signal to said flip-flop to reset said flip-flop irrespective of the electric nonconductivity of said probe path when said switch means reconnects said power supply to said probe;
    d. warning means connected to said flip-flop for giving a warning indication in response to said wire breakage detection signal, said warning means including gate means for preventing a checking means from operating on said holding circuit so as to apply a check signal only to said warning means; and
    e. said checking means connected to said warning means for producing said check signal to operate, upon checking, said warning means irrespective of said probe and said holding circuit.

2. A system according to claim 1, wherein said flip-flop includes:
    a first transistor;
    means for connecting said first transistor to said power source;
    means connecting said first transistor to said probe for causing said first transistor to become conductive when said path is broken;
    a second transistor;
    means for connecting said second transistor to a power source;
    means connecting said first transistor to said second transistor for causing said second transistor to become nonconductive when said first transistor becomes conductive; and
    feedback means connected between said first and second transistors for maintaining said first transistor conductive when said second transistor is nonconductive.

3. A system according to claim 1 wherein said switch means connects and disconnects said power source from said transistors and wherein said reset means causes said first transistor to become nonconductive when said switch means reconnects said power source to said transistors.

4. A system according to claim 3 wherein said reset means includes a capacitor connected to said first transistor for causing said first transistor to become conductive when said capacitor charges to a predetermined value and a diode serially connected to said capacitor, the serial combination connected in parallel with said probe for permitting said capacitor to charge when said electrical path is broken.

5. A system according to claim 1, wherein said flip-flop comprises a pair of logical gates having inputs and connected for feeding back output signals thereof to the inputs of each other.

6. A system according to claim 1, including a plurality of said probes each embedded in a different brake lining and means for connecting said probes in series with each other.

7. A system according to claim 1, wherein said checking means has an input terminal connected to a generator driven by an engine in a vehicle, and produces said check signal when a voltage generated by said generator is below a predetermined value.

8. A system according to claim 1, wherein said gate means includes a diode inserted between said holding circuit and said warning circuit.

9. A system according to claim 1, wherein said gate means consists of a logical circuit for operating said warning means when at least one of said wire breakage detection signal and said check signal is delivered to said logical circuit.

10. A system according to claim 1, wherein said checking means forms a feeding path for applying said check signal to said warning means in response to the closing of a key switch of a vehicle, and includes a relay for opening said feeding path when a voltage generated by a generator in said vehicle reaches a predetermined value.

11. A system according to claim 1 wherein said warning means includes a switching element which becomes conductive during receiving said wire breakage detection signal from said holding circuit, and a warning element connected to said switching element for giving a warning when energized by the conduction of said switching element.

* * * * *